United States Patent [19]

Martin

[11] 3,931,109

[45] Jan. 6, 1976

[54] PROCESS FOR COATING SUBSTRATES WITH HIGH MOLECULAR WEIGHT EPOXY RESINS

[75] Inventor: Patrick Henry Martin, Danville, Calif.

[73] Assignee: The Dow Chemical Company, Midland, Mich.

[22] Filed: Mar. 8, 1974

[21] Appl. No.: 449,408

Related U.S. Application Data

[63] Continuation-in-part of Ser. No. 234,390, March 13, 1972, abandoned.

[52] U.S. Cl..... 260/47 EP; 117/128.4; 117/161 ZB; 260/31.4 EP; 260/33.2 EP; 260/33.6 EP; 260/830 TW; 260/831

[51] Int. Cl.$^2$......................................... C08G 30/04

[58] Field of Search ....... 252/363.5; 260/47 EC, 59, 260/830 TW, 37 EP, 831, 47 EP, 363.5, 49, 30.4 EP; 106/311

[56] References Cited

UNITED STATES PATENTS 2,928,809   3/1960   Hicks.................. 260/2 X
3,716,598   2/1973   Markovitz............ 260/30.4 EP
3,824,212   7/1974   Sinnema et al. ...... 260/47 EP

FOREIGN PATENTS OR APPLICATIONS 893,191   2/1972   Canada................ 260/47

*Primary Examiner*—Donald E. Czaja
*Assistant Examiner*—T. Pertilla
*Attorney, Agent, or Firm*—James G. Carter

[57] ABSTRACT

Substrates are coated with relatively high molecular weight epoxy resin coatings by applying to a substrate a mixture comprising:
  A. a relatively low molecular weight epoxy resin such as the diglycidyl ether of bisphenol A,
  B. a phenolic hydroxyl-containing compound such as bisphenol A and
  C. a catalyst for effecting a reaction between (A) and (B), and subjecting the coated substrate to a temperature of 120° to 300°C.

8 Claims, No Drawings

PROCESS FOR COATING SUBSTRATES WITH HIGH MOLECULAR WEIGHT EPOXY RESINS

CROSS-REFERENCE TO RELATED APPLICATION

The present application is a continuation-in-part of my previous application Ser. No. 234,390 filed Mar. 13, 1972 now abandoned.

This invention relates to the application of epoxy resin coatings to substrates and more particularly to the application of high molecular weight coatings to substrates and to coating compositions not previously available.

Epoxy resin coatings are presently prepared in suitable reactors, pigmented when desired, diluted to suitable application viscosities and subsequently applied to suitable substrates.

It has now been discovered that high molecular weight, i.e. above about 15,000, epoxy resin coatings can be prepared in situ on a suitable substrate by applying a mixture of the reactant materials, usually a compound having more than one 1,2-epoxy group, a compound having more than one phenolic hydroxyl group, and a suitable catalyst, and if desired dyes, pigments, flow control agents, solvents and other suitable additives, to a suitable substrate and subsequently heating the coated substrate to effect the reaction between the epoxy-containing compound and the phenolic-hydroxyl-containing compound.

The present invention offers one or more of the following advantages.

1. less solvent is required to apply a mixture of reactive components at the same application viscosity than is required to apply a previously prepared coating of substantially the same molecular weight;
2. provides for the application of coatings which have not previously been available because they cannot readily be prepared except by the process of the present invention.

For ecological considerations, it is preferred that that the quantity of solvent employed be less than about 20% by weight, preferably from about 5 to about 20%, and most preferably, be zero.

Generally, it has not previously been possible to prepare coatings which are the reaction products of an epoxy compound containing more than two 1,2-epoxy groups and a phenolic hydroxyl-containing compound having about two phenolic hydroxyl groups or from the reaction product of a compound having more than two phenolic hydroxyl groups and a compound having about two 1,2-epoxy groups or from the reaction product of a compound having more than two, 1,2-epoxy groups and a compound having more than two phenolic hydroxyl groups, because they tend to gel in the reactor during attempts to prepare them.

The present invention therefore also concerns coating compositions comprising
A. a compound having a plurality of 1,2-epoxy groups,
B. a compound having a plurality of phenolic hydroxyl groups,
C. a catalyst for effecting the reaction between (A) and (B);
and wherein at least one of the components selected from (A) and (B) has an average functionality greater than 2, or the combined average functionality of (A) and (B) is greater than 2.

The present invention also concerns a process for applying epoxy resin coatings to substrates which comprises applying to said substrate a composition comprising:
A. an epoxy resin having more than one 1,2-epoxy group,
B. a compound having more than one phenolic hydroxyl group,
C. a catalyst for effecting reaction between (A) and (B) and heating the coated substrate to effect the reaction between (A) and (B) usually between about 120° to about 300°C and preferably from about 140°C to about 300°C for from about 10 seconds to about 60 minutes and preferably from about 10 seconds to about 30 minutes or applying said composition to a substrate preheated to a temperature of from about 120° to about 300°C, preferably from about 140°C to about 300°C, the cure thereby being obtained by the transfer of heat from the heated substrate to the coating.

The present invention also pertains to epoxy resin dispersion coatings comprising:
1. a liquid epoxy resin or mixture of such resins having more than one 1,2-epoxy group.
2. a mixture comprising (a) a solid phenolic hydroxyl-containing compound having more than one phenolic hydroxyl group and (b) a catalyst for effecting the reaction between the epoxy resin and the phenolic hydroxyl-containing compound wherein said phenolic hydroxyl-containing compound and catalyst mixture is dispersed in said liquid epoxy resin and wherein the ratio of epoxy resin to phenolic hydroxyl-containing compound is such that will result in a product having a molecular weight of at least about 15,000.

To be included in the difinition of liquid epoxy resin are solid epoxy resins which have been dissolved in a compound that is a solvent for the epoxy resin and a non-solvent for the phenolic hydroxyl-containing compound such as, for example, xylene, toluene, 2-nitropropane, high boiling commercially available aromatic solvents such as "Aromatic 100" having a boiling point of 311°–344°F, a flash point of 107°F, an aromatic content of 98.9%, and a Kauri Butanol value of 92, commercially available from Humble Oil and Refining Company.

The dispersions are conveniently prepared by melting the solid phenolic hydroxyl-containing compound and blending therein the catalyst for effecting the reaction between the epoxy resin and the phenolic hydroxyl-containing compound, cooling and forming the resultant solid mixture into particles of desired size. The thus prepared solid phenolic hydroxyl-containing compound-catalyst mixture is then dispersed in the liquid epoxy resin by any suitable means such as, for example, a ball mill, sand mill, Cowles dissolver or the like.

Pigments, flow control agents, other modifiers and the like may also be included in the dispersion and when so included, they are usually blended with the molten solid phenolic hydroxyl-containing compound along with the catalyst.

These dispersions have been discovered to possess better storage stability than a mixture comprising solutions of epoxy resin, phenolic hydroxyl-containing compound and catalyst.

The epoxy resin coatings to which this application pertains are those coatings having molecular weights above about 15,000 and preferably to above about 19,000. By molecular weight, it is meant the weight average molecular weight as determined by gel permeation chromatography.

Suitable epoxy resins which are employed in the present invention include the aromatic based epoxy resins represented by the following general formulae including mixtures thereof.

(I)

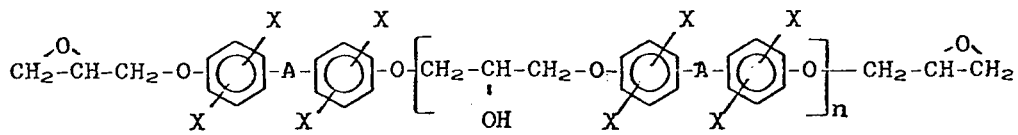

wherein A is a divalent hydrocarbon group having from about 1 to about 6 carbon atoms,

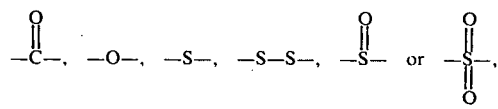

each X is independently hydrogen, chlorine or bromine, and $n$ has an average value of from about 0 to about 15 and preferably from about 0.1 to about 5.

(II)

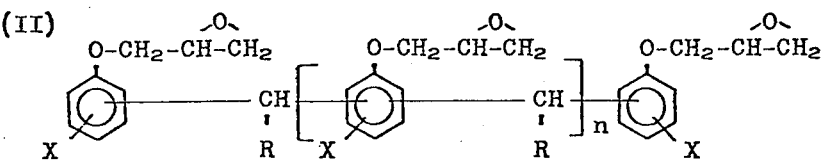

wherein R is hydrogen or an alkyl group having from about 1 to about 4 carbon atoms, $n$ has an average value of from about 0.1 to about 5, and X is hydrogen, chlorine, bromine or a lower alkyl group having from 1 to about 4 carbon atoms.

The epoxy resins employed in the present invention may be prepared by any of the well known methods such as the reaction of a bisphenolic compound with an epihalohydrin in the presence of suitable catalysts or by the reaction of a liquid polyepoxide with a bisphenol in the presence of such compounds as quaternary ammonium compounds, tertiary amines, phosphonium compounds and the like. These methods are discussed in Chapter 2 of *Handbook of Epoxy Resins* by Lee and Neville, McGraw Hill Book Co., 1967 and in U.S. Pat. No. 3,477,990 and a copending application by William O. Perry, entitled "Process for Reacting a Phenol With a Vicinal Epoxy Compound", Ser. No. 41,618, filed May 28, 1970.

Any aromatic based epoxy resin which has more than one 1,2-epoxy group are suitable for use in the present invention.

The aliphatic based epoxy resins may also be employed in the present invention and include the glycidyl ethers of aliphatic hydroxyl-containing compounds having more than one aliphatic hydroxyl group and include the glycols such as, for example, ethylene glycol, propylene glycol, 1,4-butane, diol, neopentyl glycol, dibromoneopentyl glycol, dichloroneopentyl glycol, glycerine, the oxyalkylated derivatives thereof, such as the oxypropylated, oxyethylated, oxybutylated derivatives, or mixtures thereof. Suitable aliphatic based epoxy resins also include such epoxy resins as butadiene diepoxide and the like.

Also suitable for use in the present invention are the oxazolidinone modified aromatice or aliphatic based epoxy resins which contain both oxazolidinone groups and epoxy groups provided such modified epoxy resins contain more than one 1,2-epoxy groups.

The oxazolidinone modified epoxy resins are prepared by reacting the appropriate glycidyl ether epoxy resin having more than one glycidyl ether groups with a polyisocyanate such as, for example, toluene diisocyanate, in the presence of a suitable catalyst such as a tertiary amine, quaternary ammonium compound or phosphonium compound and also in the presence of a primary or secondary alcohol. A preferred method is to react the epoxy resin with a carbamate formed by the reaction of an alcohol such as methanol with the polyisocyanate. The epoxy resin is employed in an excess, preferably at least 2 epoxy groups for each NCO group contained in the polyisocyanate and as much as 10 epoxy groups for each NCO group.

Other suitable epoxy resins include the esterfied epoxy resins prepared by reacting an epoxy resin having more than one 1,2-epoxy group with a dimer carboxylic acid in a ratio such that there is at least 2 epoxy groups for each carboxylic acid group.

Suitable compounds which have a plurality of phenolic hydroxyl groups include the polyhydric phenols represented by the following general formulae, including mixtures thereof.

(III)

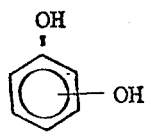

(IV)

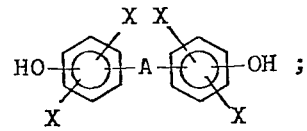

(V)

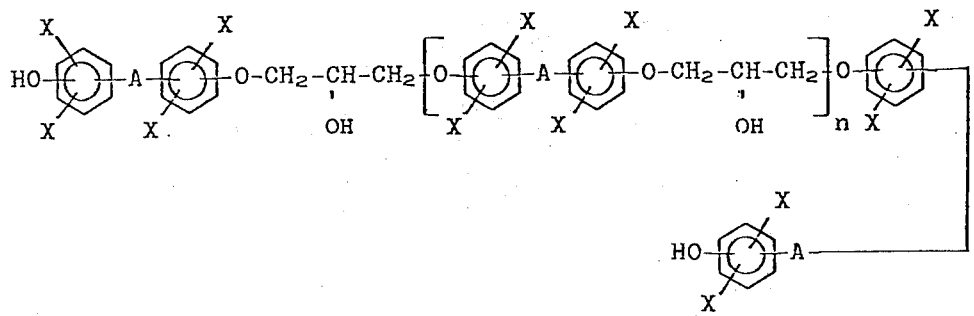

wherein X and A are as defined in formula (I) and $n$ has an average value of from about 1 to about 4 and preferably from about 2 to about 3;

(VI)

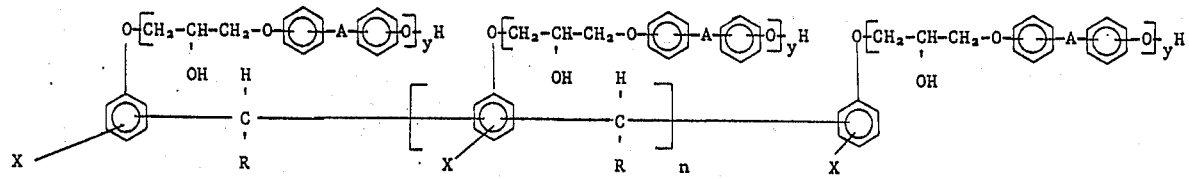

wherein R and X are defined in formula (II) and $n$ has an average value of from about 1 to about 8 and preferably from about 2 to about 4, $y = 0$ or 1 and A is as defined in formula I.

The resins represented by the above formula VI wherein $y = 1$ are conveniently prepared by reacting a bisphenol with an epoxy novolac resin.

(VII)

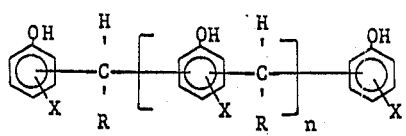

wherein R, X and $n$ are as defined in formula VI.

The compounds represented by formula V are readily prepared by reacting an excess of a bisphenol with a diglycidyl ether of a bisphenol in the presence of a suitable catalyst.

Suitable catalysts which are employed to effect the reaction between the epoxy group and the phenolic hydroxyl groups include the phosphonium salts of organic and inorganic acids, imidazoles, imidazolines, quaternary ammonium compounds and the like. Any catalyst which will effectively promote the reaction between a 1,2-epoxide group and a phenolic hydroxyl group can suitably be employed in the present invention.

The catalysts are generally employed in quantities of from about 0.001% to about 10% and preferably from about 0.05% to about 5% by weight based upon the combined weight of the reactants, i.e. the weight of epoxy-containing compound plus the weight of the phenolic hydroxyl-containing compound.

The inorganic and organic phosphonium compounds which are employed in the process of the present invention, as catalysts, include phosphonium salts of an acid, acid ester or ester of an element selected from the group consisting of carbon, nitrogen, phosphorus, sulfur, silicon, chlorine, bromine, iodine and boron which are represented by the general formula:

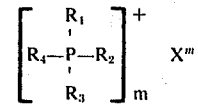

wherein $R_1$, $R_2$, $R_3$ and $R_4$ are independently selected from the group consisting of hydrogen, aliphatic hydrocarbon radicals containing from about 1 to 20 carbon atoms, aromatic hydrocarbon radicals, alkyl substituted aromatic hydrocarbon radicals and radicals represented by the formula $-R_5-Y$ wherein $R_5$ is an aliphatic hydrocarbon radical having from about 1 to about 20 carbon atoms and Y is a member selected from the group consisting of Cl, Br, I, $NO_2$, H and OH and where X is the anion portion of an acid, ester or acid ester of an element selected from carbon, nitrogen, phosphorus, sulfur, silicon, chlorine, bromine, iodine and boron and wherein $m$ is the valence of the anion X.

Particularly suitable catalysts include ethyltriphenyl phosphonium iodide, ethyltriphenyl phosphonium chloride, ethyltriphenyl phosphonium thiocyanate, ethyltriphenyl phosphonium acetate acetic acid complex, tetrabutyl phosphonium iodide, tetrabutyl phosphonium bromide, and tetrabutyl phosphonium acetate acetic acid complex.

These and other phosphonium catalysts are more fully described in U.S. Pat. Nos. 3,477,990 and U.S. Pat. No. 3,341,580 and in a copending application by William O. Perry entitled, "Process for Reacting a Phenol With a Vicinal Epoxy Compound", Ser. No. 41,618, filed May 28, 1970.

Suitable imidazoles which may be employed as catalysts in the present invention include, for example, 2-styrylimidazole, 1-benzyl-2-methylimidazole, 2-methylimidazole, 2-butylimidazole, mixtures thereof and the like. These and other suitable catalysts are disclosed in Belgium Pat. No. 756,693.

Suitable solvents include, for example, the oxygenated solvents such as acetone, methylethyl ketone, cyclohexanone, diacetone alcohol, mixtures thereof and the like, and the glycol ethers such as ethylene glycol, ethyl ether acetate; ethylene glycol, methyl ether; ethylene glycol, n-butyl ether; diethylene glycol, ethyl ether; diethylene glycol, n-butyl ether; propylene glycol, methyl ether; dipropylene glycol, methyl ether; mixtures thereof and the like and in admixture with aromatic solvents such as, for example, xylene, toluene, ethylbenzene and the like. Other suitable solvents include the halogenated solvents such as trichloroethylene, methylene chloride and the like.

The substrates which are employed in the process of the present invention are metallic substrates such as steel, aluminum, etc. but any substrate which will withstand temperatures of at least about 130°C can be employed.

Pigments, fillers, dyes, flow control agents and other modifier compounds may also be employed in the coating compositions employed in the coating process or method of the present invention.

In practicing the process of the present invention, the ratio of epoxy resin to phenolic hydroxyl-containing compound varies depending upon the molecular weight desired of the coating being prepared as well as the functionality of the reactive components; in any event the molecular weight of the epoxy resin will be substantially less than the ultimate molecular weight obtained as the coating on the substrate being coated.

Those skilled in the art will readily recognize the ratio of epoxy compound to phenolic hydroxyl-containing compound required to produce a product of desired molecular weight or simple experimentation can be employed to arrive at the desirable ratio for any desired molecular weight.

The combined average functionality is readily calculated by the following equation:

$$F_{CA} = A/A + B \ (F_A) + B/A + B \ (F_B)$$

where:

$A$ = weight of phenolic hydroxyl-containing compound
$B$ = weight of epoxy resin
$F_A$ = functionality of phenolic hydroxyl-containing compound
$F_B$ = functionality of epoxy resin
$F_{CA}$ = combined average functionality Following is a sample calculation employing the components of Example 4.

$$F_{CA} = \frac{30}{100}(2.0) + \frac{70}{100}(3.6)$$

$$= .6 + 2.52$$

$$= 3.12$$

In general, however, the ratio of

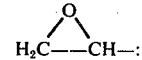

phenolic OH is such as to provide a resultant resin having a molecular weight of at least about 15,000. Those skilled in the field of epoxy resins can readily ascertain with relatively simple experimentation the desired ratios for the particular components employed.

In the present invention, the coated substrates are subjected to temperatures which will effect the reaction between the epoxy resin and the phenolic hydroxyl containing compound. The time employed is, of course, dependent upon the temperature, the mass of the coated substrate, etc. For example, thin metallic substrates subjected to a temperature of 300°C would require only a few seconds to effect and complete the reaction whereas automobile bodies subjected to a temperature of 120°C would require upwards to 60 minutes to effect and complete the reaction between the epoxy resin and the phenolic hydroxyl-containing compound.

The coatings of the present invention can be employed as coatings for such articles as automobiles, machinery, appliances, containers and the like.

The following examples are illustrative of the present invention but are not to be construed as limiting the scope thereof in any manner.

EXAMPLES 1-3

Bonderized steel panels were coated with various compositions comprising a diglycidyl ether of bisphenol A (DGEBA) having an epoxide equivalent weight of 187, bisphenol A, ethyl triphenyl phosphonium acetate.acetic acid complex catalyst (ETPA.HAc) and the monomethyl ether of ethylene glycol (EGME) as a solvent. After applying the compositions to the bonderized steel panels they were baked in an oven at 400°F for 30 minutes. The coatings had a dry film thickness of 1.3 mils. The compositions and properties are given in the following Table I.

TABLE I

| COMPONENT | COMPARATIVE Ex. A | Example 1 | Example 2 | Example 3 | COMPARATIVE Ex. B |
|---|---|---|---|---|---|
| DGEBA, pbw[1] | 70 | 65 | 63 | 60 | 63 |
| Bisphenol A, pbw | 30 | 35 | 37 | 40 | 37 |
| ETPA·HAc, pbw | .35 | .33 | .32 | .30 | none |
| EGME, pbw | 33 | 33 | 33 | 33 | 33 |
| percent non-volatiles | 75 | 75 | 75 | 75 | 75 |

TABLE I-continued

| COMPONENT | COMPARATIVE Ex. A | Example 1 | Example 2 | Example 3 | COMPARATIVE Ex. B |
|---|---|---|---|---|---|
| Gardner viscosity, poises[2] | 2 | 2 | 2 | 2 | 2 |
| PHYSICAL PROPERTIES AFTER HEATING AT 400°F FOR 30 MINUTES | | | | | |
| Spatula toughness[3] | Poor (brittle) | Excellent | Excellent | Excellent | Very Brittle |
| Reverse impact, in-lbs. | Fail 20, Passed 10 | Fail 40, Passed 20 | Passed 160 | Fail 40, Passed 20 | Fail 5 |
| Weight average molecular wt. determined by GPC[4] | 7,752 | 16,979 | 29,931 | 21,893 | 1,300 |

EXAMPLES 4–8

A high solids epoxy solution was prepared by mixing a 3.6 functional epoxy novolac resin having a EEW of 176, bisphenol A, ethyltriphenyl phosphonium acetate.acetic acid complex catalyst (ETPA.HAc) and the monomethyl ether of ethylene glycol (EGME) as a solvent. The solutions were then applied to bonderized steel panels to a dry film thickness of 1.3 mils and baked in an oven at 400°F for 30 minutes. The following Table II gives the quantities of components employed and the physical properties of the resultant coating.

TABLE II

| COMPONENT | Example 4 | Example 5 | Example 6 | Example 7 | Example 8 |
|---|---|---|---|---|---|
| Epoxy novolac, pbw[1] | 70 | 65 | 63 | 62 | 60 |
| Bisphenol A, pbw | 30 | 35 | 37 | 38 | 40 |
| ETPA·HAc | .35 | .33 | .32 | .31 | .30 |
| EGME | 33 | 33 | 33 | 33 | 33 |
| Percent non-volatiles | 75 | 75 | 75 | 75 | 75 |
| Gardner viscosity, poises[2] | 3.1 | 3.1 | 3.1 | 3.2 | 3.2 |
| Combined average functionality | 3.12 | 3.04 | 3.01 | 2.99 | 2.96 |
| PROPERTIES AFTER HEATING AT 400°F FOR 30 MINUTES | | | | | |
| Spatula Toughness[3] | Excellent | Excellent | Excellent | Excellent | Excellent |
| Reverse Impact, in.-lbs. | Pass 100 | Pass 160 | Pass 160 | Pass 160 | Pass 160 |
| 5-min. methyl ethyl ketone resistance[5] | Severely Soft | Excellent | Excellent | Excellent | Excellent |
| Wt. Avg. M.W. as determined by GPC[4] | >27,000 | >27,000 | >27,000 | >27,000 | >27,000 |

FOOTNOTES TO TABLES I AND II
[1] pbw = parts by weight
[2] The Gardner viscosity was measured at 25°C.
[3] Spatula toughness was determined by scraping the coated surface with the edge of a steel spatula and if the coating required heavy pressure to be removed from the substrate the coating was considered to have an excellent rating; if it took little pressure to be removed, it would be given a poor rating.
[4] GPC is Gel Permeation Chromatography.
[5] The 5-minute methyl ethyl ketone resistance was determined by saturating a cloth with the solvent, placing the cloth over the coating and covering the cloth covered panel with a watch glass. After 5 minutes, the portion tested was scratched with a steel spatula and if heavy pressure was required to remove the coating it was given an excellent rating. If it required little or no pressure, it was given a severely soft rating.

EXAMPLE 9

A pigmented primer powder coating was prepared in the following manner.

Epoxy Resin

A commercially available solid epoxy resin of the digylcidyl ether of bisphenol A type having an EEW of 887 and a Durran's softening point of 99°C commercially available from The Dow Chemical Company as D.E.R. 664.

SOLID PHENOLIC HYDROXYL CONTAINING COMPOUND

A solid phenolic hydroxyl containing compound was prepared by reacting a mixture of 140 lbs. of digylcidyl ether of bisphenol A having an EEW of 187,
171 lbs. of bisphenol A,
171 lbs. of bisphenol A,
40 grams of an 80% solution in methanol of ethyl triphenyl phosphonium acetate.

PROCEDURE

A mixture of 68.6 grams of the above mentioned D.E.R. 664 solid epoxy resin, 31.4 grams of the above prepared solid phenolic hydroxyl containing compound, 1.0 grams of Modaflow flow control agent from Monsanto Chemical and 0.45 grams of ethyl triphenyl phosphonium acetate was melt blended at a temperature of about 120°C for 10 minutes with a Cowles dissolver then cooled and flaked. This was then dry blended with 100 grams of barium sulfate in a Welex blender and extruded through a Baker-Perkins Ko-Kneader extruder at about 100°C. The resultant blend was then cooled, flaked, powdered and screened. A portion of the product which passed through a 325 mesh U.S. Standard Screen was electrostatically sprayed onto a bonderized steel panel to a dry film thickness of 1 mil, then baked in an oven for 30 minutes at 350°F. The cured film exhibited excellent intercoat adhesion for a thermoplastic acrylic automotive topcoat, and the weight average molecular weight of the cured film was 28,455 as determined by GPC. The film also passed 160 pounds reverse impact at a dry film thickness of 1 mil.

EXAMPLE 10

Formulation A — Example of the Present Invention

A mixture of 37 grams of bisphenol A, 63 grams of the diglycidyl ether of bisphenol A having an EEW of 190 and .5 grams of ethyltriphenyl phosphonium acetate.acetic acid complex as a catalyst was diluted to a viscosity at 25°C of 18 second NO. 2 Zahn cup with 100 grams of methyl ethyl ketone to a percent nonvolatile of 50. This coating expends to the atmosphere 100 grams of solvent for every 100 grams of resin solid applied.

Formulation B — Comparative Example:

About 100 grams of a commercially available epoxy resin designated as D.E.R. 684 EK 40 that is essentially the reaction product of the digylcidyl ether of bisphenol A with bisphenol A containing 40% by weight of said reaction product having an average molecular weight of about 25,000 by gel permeation chromatography and 60% by weight of the solvent methyl ethyl ketone was diluted to a viscosity at 25°C of 18 seconds No. 2 Zahn cup with 128 grams of methyl ethyl ketone to a percent non-volatiles of 17.8. This coating evaporates into the atmosphere 470 grams of solvent for each 100 grams of resin solid applied.

Formulation A above was then applied to a steel panel and placed in an oven for 30 minutes at 155°C. Formulation B was applied to a steel panel and the solvent removed by baking at 110 minutes at 120°F.

The physical properties of each of the above coatings and the molecular weight of each coating were then obtained. The results are given in the Table below.

TABLE III

|  | Example 10-A | Comparative Formulation B |
|---|---|---|
| Grams of solvent evaporated into the atmosphere per 100 grams of solid resin applied | 100 | 470 |
| Reverse impact, in-lbs. | Passed 160 | Passed 160 |
| 180° Conical Mandrel bend | Passed | Passed |
| Weight average molecular weight as determined by gel permeation chromatography | 29,931 | 27,500 |

EXAMPLE 11 (Comparative)

To demonstrate that a coating composition cannot be prepared by conventional means from a compound having 2 phenolic hydroxyl groups and an epoxy resin having more than 2 epoxy groups, the following reaction was conducted.

Into a suitable reactor equipped with a means for stirring and temperature control were added 35 parts by weight of bisphenol A, 65 parts by weight of a 3.6 functional epoxy novolac resin having an EEW of about 176, 33 parts by weight of the monoethyl ether of ethylene glycol as a solvent and 0.33 parts by weight of ethyltriphenyl phosphonium acetate.acetic acid complex as a catalyst. The temperature was raised to 120°C with stirring and after about 15 minutes the contents of the reaction vessel gelled.

EXAMPLE 12

This example is illustrative of the dispersion technique for applying the coatings of this invention.

Preparation of Esterified Epoxy Resin (Component I)

To a suitable reaction vessel equipped with a stirrer and temperature control means were added:
86.1 parts by weight of Empol Dimer Acid 1010[1]
213.6 parts by weight of D.E.N. 438[2]
0.3 parts by weight of ethyl triphenyl phosphonium acetate.acetic acid complex
0.07 parts by weight of sodium carbonate.

After stirring the mixture at 150°C for 1 hour, the resultant product was cooled and reduced to 80% non-volatiles with Aromatic 100[3] solvent. This product was designated as Component I and had the following properties.

| Acid Number | 2 |
|---|---|
| % Epoxide | 13.2 |
| Viscosity, Gardner | $Z_3$-$Z_4$ |

Preparation of Component II

995 Parts by weight of bisphenol A was melt blended with 05 parts by weight of ethyltriphenyl phosphonium acetate.acetic acid complex catalyst A dispersion coating was prepared by thoroughly mixing in a high speed mixer the following:
100 parts by weight of Component I,
82.6 parts by weight of xylene,
27.6 parts by weight of Component II,
3 drops of BYK 300[4] as a flow control agent.

The resultant dispersion had a % non-volatiles of 50 and a Gardner viscosity of 15-20 seconds.

The above dispersion was then reduced to a Gardner viscosity of 5 seconds with xylene and then applied to a caustic washed aluminum panel with a 12 wire wound rod. The coated panel was baked in an oven at 350°F for 5 minutes. The dry film had a thickness of 0.3–0.6 mils and passed 30 inch pounds forward impact without rupture as determined by a copper sulfate stain test.

The dispersion coating exhibited excellent stability for at least 6 weeks.

[1] Empol Dimer Acid 1010 was a mixture of 97% $C_{36}$ dibasic acid having a molecular weight of approximately 845 and 3% by weight of $C_{54}$ tribasic acids having a molecular weight of approximately 845, said mixture having an acid value of 191–197 commercially available from Emery Industries, Inc.
[2] D.E.N. 438 was an epoxy novolac resin having an EEW of about 180 and a functionality of about 3.6, commercially available from The Dow Chemical Company.
[3] Aromatic 100 was a solvent comprising 98.9% aromatics and 1.1% paraffins having a boiling range of 311°–344°F, commercially available from Humble Oil & Refining Co.,
[4] BYK 300 was a paint compatible silicone resin having a specific gravity of 0.94 and a refractive index of 1.465 commercially available from Byk-Mallinckrodt Chem. Produkte GmbH.

EXAMPLE 13

A series of coating compositions were prepared from the following composition:
186 grams of D.E.N. 438
114 grams of bisphenol A
100 grams of the monoethylether of ethylene glycol ($C_2H_5$—O—$C_2H_4OH$)
98 grams of Butyl Cellosolve Acetate
1.5 grams of a cellulose acetate butyrate resin (CAB) as a flow control additive.
various quantities of catalysts as indicated in Table IV.

The above compositions were prepared by melt blending the D.E.N. 438, bisphenol A and CAB resin at 110°–120°C. The mixture was cooled and the solvents and catalyst were added. The compositions were then coated onto test panels. The catalyst and results are given in the following Table IV.

TABLE IV

| Experiment No. | Catalyst Type/%[1] | Type of Test Panel | Cure Schedule Min./°F | Film Thickness Mils | Reverse Impact |
| --- | --- | --- | --- | --- | --- |
| A | 2MI[2]/0.2 | A[3] | 10/350 | 0.9–1.1 | >160 |
| B | " | A | 5/350 | 1.0 | 100 |
| C | " | A | 10/350 | 0.4 | >160 |
| D | " | A | 5/350 | 0.4 | 50–100 |
| E | " | B[4] | 5/350 | 1.1 | >160 |
| F | " | B | 4/350 | 1.1 | <40 |
| G | " | B | 3/350 | 1.1 | not cured |
| H | " | B | 10/300 | 1.0–1.1 | <20 |
| I | " | B | 8/300 | 1.0–1.1 | not cured |
| J | " | C[5] | 4/350 | 1.1 | >60 |
| K | " | C | 3/350 | 1.1 | <20 |
| L | " | C | 2/350 | 1.1 | not cured |
| M | 2MI/0.5 | B | 10/350 | 1.0–1.1 | 120 |
| N | " | B | 5/350 | 1.0–1.1 | 120 |
| O | ETPPSCN[6]/0.6 | A | 10/350 | 0.9–1.1 | 160 |
| P | " | A | 5/350 | 1.0 | <160 |

[1] % of catalyst was based upon the non-volatile components of the composition.
[2] 2MI was 2-methylimidazole.
[3] Test panel A was 20-guage Bonderite.
[4] Test panel B was cold rolled steel.
[5] Test panel C was aluminum.
[6] ETPPSCN was ethyltriphenylphosphonium thiocyanate.

EXAMPLE 14

Preparation of dispersion of present invention (A) and a comparative dispersion (B) for stability on storage.

As an example of the present invention, 228 g. of bisphenol-A were melted and mixed with 1 g. of ethyltriphenyl phosphonium acetate.acetic acid complex. The mixture was then allowed to cool and solidify. This product was then ground into a fine powder and added to a container containing 378 g. of a diglycidyl ether of bisphenol A (DGEBA) having an equivalent weight (EEW) of about 189. The mixture was then ball-milled for 18 hours to obtain a dispersion of the bisphenol catalyst mixture in the epoxy resin. This dispersion having a weight average molecular weight as determined by gel permeation chromatography (GPC) of 395 was stored at 25°C for forty-nine days then examined. The product was still a fluid dispersion. Analysis, after storage, by gel permeation chromatography indicated a weight average molecular weight of 567.

For a comparative experiment (B), one gram of ethyltriphenyl phosphonium acetate.acetic acid complex was mixed with 378 g. of DGEBA having an EEW of about 189. To this mixture was then added 228 g. of bisphenol-A that had been ground into a fine powder. The mixture was then ball-milled for 18 hours to obtain a dispersion of the bisphenol in the epoxy resin-catalyst mixture. This dispersion having a weight average molecular weight of 395 as determined by GPC was stored at 25°C for 49 days then examined. The product was a solid. Analysis, after storage, by gel permeation chromatography indicated a weight average molecular weight of 1126.

It is readily ascertainable from the above example that the dispersions of the present invention wherein the catalyst is mixed with the phenolic or hydroxyl-containing compound before being dispersed into the epoxy resin are much more stable than the comparative dispersion wherein the phenolic hydroxyl-containing compound was dispersed into a mixture of the epoxy resin and catalyst.

EXAMPLE 15

Aluminum and tin-free steel panels were coated with a composition containing a 2.2 functional epoxy novolac resin having an EEW of 163, a 3.6 functional epoxy novolac resin having an EEW of 176, bisphenol A, 2-methylimidazole catalyst and the mono-methyl ether of propylene glycol (PGME) as a solvent. Panels were coated with this composition to a dry film thickness of 0.4 mils and baked in an oven at 400°F for ten minutes. The following Table V gives the quantities of components employed and the physical properties of the resultant coatings. This coating expends to the atmosphere 25 grams of solvent for every 100 grams of resin solid (non-volatile materials) applied.

TABLE V

| COMPONENT | pbw[1] |
| --- | --- |
| 2.2 f Epoxy Novolac | 52.8 |
| 3.6 f Epoxy Novolac | 7.2 |
| Bisphenol A | 40 |
| 2-Methylimidazole | 0.2 |
| PGME | 25 |
| % Non-Volatiles | 80 |
| GARDNER-HOLD VISCOSITY | |
| At 23°C | V |
| At 40°C | F-G |
| At 50°C | A-2 |

PHYSICAL PROPERTIES AFTER HEATING AT 400°F FOR TEN MINUTES

| Substrate | Aluminum[2] | TFS[3] |
| --- | --- | --- |
| MEK Resistance[4] | Slight Softening at 80 double rubs | Slight Softening at 80 double rubs |
| Flexibility[5] | Pass 4" | Pass 4" |
| Impact[6] | | |
| Forward | >40 in-lbs. | >12 in-lbs. |
| Reverse | >40 in-lbs. | >12 in-lbs. |

[1] pbw = parts by weight.
[2] 24 gauge untreated aluminum.
[3] 38 gauge chrome-chromoxide treated tin-free steel.
[4] MEK Resistance — a 2-lb. ball-pein hammer with a piece of cheese cloth is attached to the pein part of the hammer and the cloth is saturated with MEK. The cloth covered pein of the hammer is pushed across the coating until the film shows evidence of failure. One hundred double rubs is considered excellent.
[5] Gardner Wedge Bend, ASTM-D522-68.
[6] Gardner Impact, ASTM-D256-56.

I claim:

1. An epoxy resin coating composition comprising in dispersed form
   1. a liquid epoxy resin having more than one 1,2-epoxy groups
   2. a mixture comprising a solid phenolic hydroxyl containing compound having more than one phenolic hydroxyl group and a catalytic amount of a catalyst for effecting the reaction between the epoxy groups and the phenolic hydroxyl groups selected from the group consisting of phosphonium salts of organic and inorganic acids, imidazoles, imidazolines and quaternary ammonium compounds;

wherein the epoxy resin and phenolic hydroxyl-containing compound are employed in quantities such as to provide a product having an average molecular weight of at least about 15,000 and wherein said phenolic hydroxyl-containing compound and catalyst mixture is dispersed in said liquid epoxy resin.

2. The composition of claim 1 wherein the epoxy resin is a liquid epoxy resin dissolved in a solvent that is a non-solvent for the phenolic hydroxyl-containing compound.

3. The composition of claim 1 wherein the epoxy resin is a solid dissolved in a solvent that is a non-solvent for the phenolic hydroxyl-containing compound.

4. The composition of claim 3 wherein the epoxy resin is a phenolic-based epoxy resin.

5. The composition of claim 4 wherein at least one of the components selected from the epoxy resin and the phenolic hydroxyl-containing compound has a functionality greater than 2.

6. The composition of claim 5 wherein the epoxy resin has a functionality greater than 2.

7. The composition of claim 1 wherein said solid phenolic hydroxyl-containing compound is a material represented by the formula

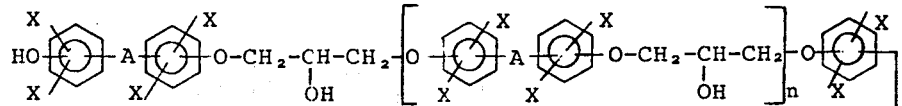

wherein A is a divalent hydrocarbon group having from about 1 to about 6 carbon atoms,

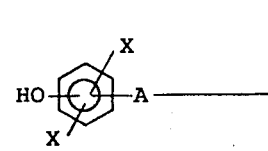

each X is independently hydrogen, chlorine or bromine, and $n$ has an average value of from about 1 to about 4.

8. The composition of claim 7 wherein Component A is an isopropylidene group, each X is hydrogen.

* * * * *